July 26, 1966 L. A. ATTERMEYER ET AL 3,262,368
TURBINE BLADE MILLING APPARATUS
Filed Nov. 2, 1964 3 Sheets-Sheet 1

INVENTORS
Lawrence A. Attermeyer
Louis W. Young
BY
ATTORNEYS

United States Patent Office 3,262,368
Patented July 26, 1966

3,262,368
TURBINE BLADE MILLING APPARATUS
Lawrence A. Attermeyer and Louis W. Young, Cincinnati, Ohio, assignors to The Cincinnati Milling Machine Co., Cincinnati, Ohio, a corporation of Ohio
Filed Nov. 2, 1964, Ser. No. 408,051
13 Claims. (Cl. 90—11)

This invention relates to a milling machine for producing aerodynamically shaped turbine blades and more particularly to a lateral thrust support mechanism movable along the turbine blade in advance of the cutting tool to reduce lateral deflection of the blade.

A common method of machining turbine blades is by supporting a blade blank from its root end, rotating the blade blank on a fixed axis and moving a cutting tool along the length of the blade while simultaneously moving the cutting tool to and from the blade blank in coordination with rotation of the blank and in accordance with a preformed master blade or prerecorded program. This method has been used extensively in the past and continues to be one of the best methods of blade contour generation. The trend in recent years, however, has been toward more carefully designed blades of greater precision, which blades give a more economical use of both space and material. This has resulted in blades of reduced cross section, the contour of which must be carefully produced and duplicated time after time. In addition, the size and capacity of power generation units has increased with a resulting demand for larger turbine blades of considerable length, some blades being up to 50 inches or more along the length of their aerodynamic contour. Since the blades in the described process of production are supported only from the ends, there is a considerable amount of deflection of the blade blank as it is being machined in the middle areas of its length and as a result it is difficult to machine at the most economical rates while maintaining dimensional and surface finish tolerances. Attempts to provide lateral support during cutting through the middle areas of turbine blades between tip and root have been frustrated in the main by the nature of the blade itself. The blade has a constantly changing cross section and frequently has a twisted appearance. In addition irregularities are normally found on the blade, for example, shields to prevent blade erosion and lashing studs which are used to tie adjacent blades together around the turbine wheel to prevent flutter and vibration along their length.

It is therefore an object of this invention to provide a mechanism for supporting a turbine blade blank to resist side thrust during machining by the described process at the time that cutting is occurring in the middle longitudinal areas of the blade to thereby reduce lateral deflection, improve dimensional tolerance and increase the rate of cutting.

It is also an object of this invention to provide a mechanism for supporting a turbine blade against lateral deflection during machining, which mechanism acts on the blade at a location close to the cutting tool and which mechanism advances with the cutting operation along the length of the blade.

A further object is to provide a mechanism which will advance in correspondence with advance of the cutting tool along a turbine blade having a twisted contour and which will prevent lateral deflection of the blade.

Another object of this invention is to provide a lateral support unit which will advance along a turbine blade during a cutting operation without interference with preformed lashing studs, erosion shields and other deviations from aerodynamic contours that are normally found on turbine blades.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The mechanism of this invention employs a freely rotatable turn-table or platform which has a central opening through which a turbine blade blank to be machined will loosely pass end to end. The platform is freely rotatable on the same fixed axis on which the blade blank is rotated during a cutting process. The platform carries a gripping apparatus which operates to forcibly engage the blade blank at a location just in advance of the area in which the cutting tool is removing material. The gripping apparatus includes a locking mechanism which locks it firmly against movement away from the blade blank. Since in the normal cutting operation the cut progresses from the tip to root, the cross section of the blade enlarges as it is generated and the blade blank gets progressively larger from tip to root section. Therefore the gripping apparatus must be constantly readjusted along the blade blank as the cutting operation proceeds. As a result of the shape of the turbine blade at any cross sectional area, a cut of very light force is taken just at the leading and trailing edges. Because the longest dimension of the blade extends away from the cutter behind these edges, the strength of the blade to withstand deflection is greatest at the time of cutting the leading and trailing edges. Since the cutting force is least and the blade strength to resist deflection is greatest at this time, no additional lateral deflection prevention mechanism is actually required at the time of cutting on these edges. Therefore the mechanism of this invention in its preferred form also includes a releasing mechanism which operates to unlock the gripping means at each time the cutting tool negotiates around the leading or trailing edge areas. This acts to relieve excess stress resulting from the increase in cross section of the blade blank as it is pushed through the gripping apparatus during the gradual progress of the cutting operation and gripping mechanism along the blade length. Since the deflection is normally at a minimum amount at these times, the momentary release to relieve excess pressure has no harmful effect on the machine performance or on the uniformity of cutting. The gripping means in effect is dragged along the blade blank between times of release and the pressure increases during this time. The feed along the length of the blade normally does not exceed 0.100 inch per revolution and therefore with momentary release of gripping at both leading and trailing edges, the excess pressure is relieved after no more than approximately every 0.050 inch along the blade and no serious problem is encountered as a result of excess pressure. The gripping apparatus will leave contact marks along the surface of the blade blank, but by positioning the mechanism in advance of the cutting tool, the marks in the rough blade blank are subsequently machined off in the normal milling of the blade and are not of any consequence.

A clear understanding of the invention can be obtained from the following description in which reference is made to the attached drawings wherein.

Figure 1:
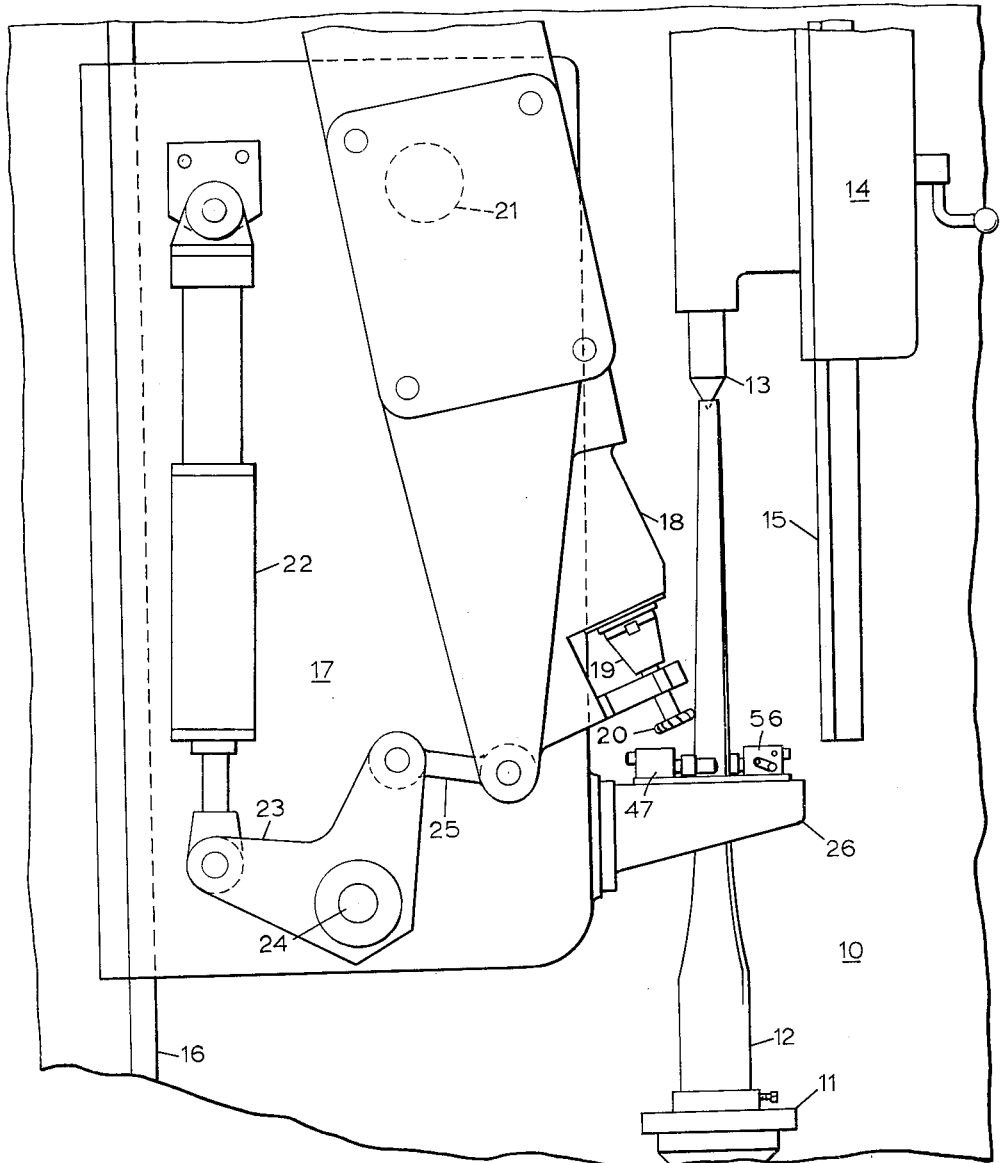
FIG. 1 is a partial side elevation view of a turbine blade milling machine of conventional arrangement with the mechanism of this invention attached thereto.

In FIG. 1 there is shown in simplified form a turbine blade milling machine for simultaneously machining several turbine blades at one time, there being a plurality of work stations in line along the machine and directly behind the machine side shown that are operated in unison. The machine includes a frame 10 on which a fixture 11 is rotatably mounted at each work station. The fixtures 11 are rotated by conventional hydraulic motor means, not shown. Each fixture 11 is adapted to receive the root end of a blade blank 12 to be machined to a aerodynamic turbine blade contour. The outer or tip end of the blade blank 12 is supported against lateral movement by a respective center 13 which is engaged thereagainst. The center 13 and the centers for the other work stations are carried in a tailstock unit 14 that is adjustably positioned along ways 15 on the frame 10 so that blades of different lengths can be accommodated by the machine. The frame 10 also has included thereon ways 16 on which a saddle unit 17 is slidably received for movement in the vertical direction as viewed in FIG. 1. The mechanism for moving the saddle 17 is of conventional nature and can be any mechanism for moving the saddle 17 at a slow and controlled rate along the ways 16. Mechanisms to perform this function are well known in the machine tool art and further description herein is therefore omitted. The saddle 17 has supported thereon a spindle carrier unit 18 from which spindles 19 extend and each spindle 19 has a cutting tool 20 attached thereto which is rotated and carried into contact with a respective one of the blade blanks 12 as each blade blank 12 is rotated to produce the turbine blade contour. Since there are a plurality of work stations along the machine, the carrier 18 has a row of the spindles 19 in line along it directly behind the one showing. In the machine the spindle carrier 18 is swingably mounted on a trunnion 21 to permit the spindle carrier 18 to be swung away from the saddle 17 and toward the blade blank 12. Swinging movement of the spindle carrier 18 is accomplished by a hydraulic piston and cylinder motor 22 that operates to swing a lever 23 about a pivot point 24 on the saddle 17. The lever 23 is connected to the lower end of the spindle carrier 18 by a connecting rod 25 and as the motor 22 is operated to rotate the lever 23 one way and the other, a force is transmitted by the rod 25 to the spindle carrier 18 which causes it to swing around the trunnion 21 and to carry all of the cutting tools 22 to and from the blade blanks 12. The operation of the motor 22 is under the direction of an automatic control mechanism, not shown, which can be of the hydraulic depth tracer type employing a master blade, well known in the art, or which might be a prerecorded program in the form of punched cards or tape which is operated in an electronic control unit of the type normally referred to in the art as numerical control.

In the case of a master and tracer control system, the tracing stylus is shaped like the cutters 22 and is moved progressively along a master at the same rate that the saddle 17 is moved downward. The master blade is also rotated in unison with the blade blank 12. The tracing stylus is carried in a member also swingable about a trunnion like the carrier 18 to hold the stylus against the master with a preset force. To maintain this, the stylus is caused to swing toward and away from the master as the contour of the contact area changes. By conventional hydraulic control, the carrier 18 is made to follow so that the cutters 20 move in unison with the tracing stylus. In this way the swinging movement of the spindle carrier 18 is coordinated with rotation of the blade blank 12 and each cutter 20 is moved to engage the respective blade blank 12 in such a manner that metal is removed therefrom to produce a desired aerodynamically shaped turbine blade. At the same time that the spindle carrier 18 is moving to and from the blade blanks 12 and while the blade blanks 12 are being rotated by the fixtures 11, the saddle 17 is moving downward on the ways 16 at a constant rate. Therefore the path of contact of each cutter 20 with the blade blank 12 is in a spiral form beginning at the upper or tip end of the blade blank 12 that is engaged by the center 13 and progressing downward toward the fixture 11.

Figure 6:
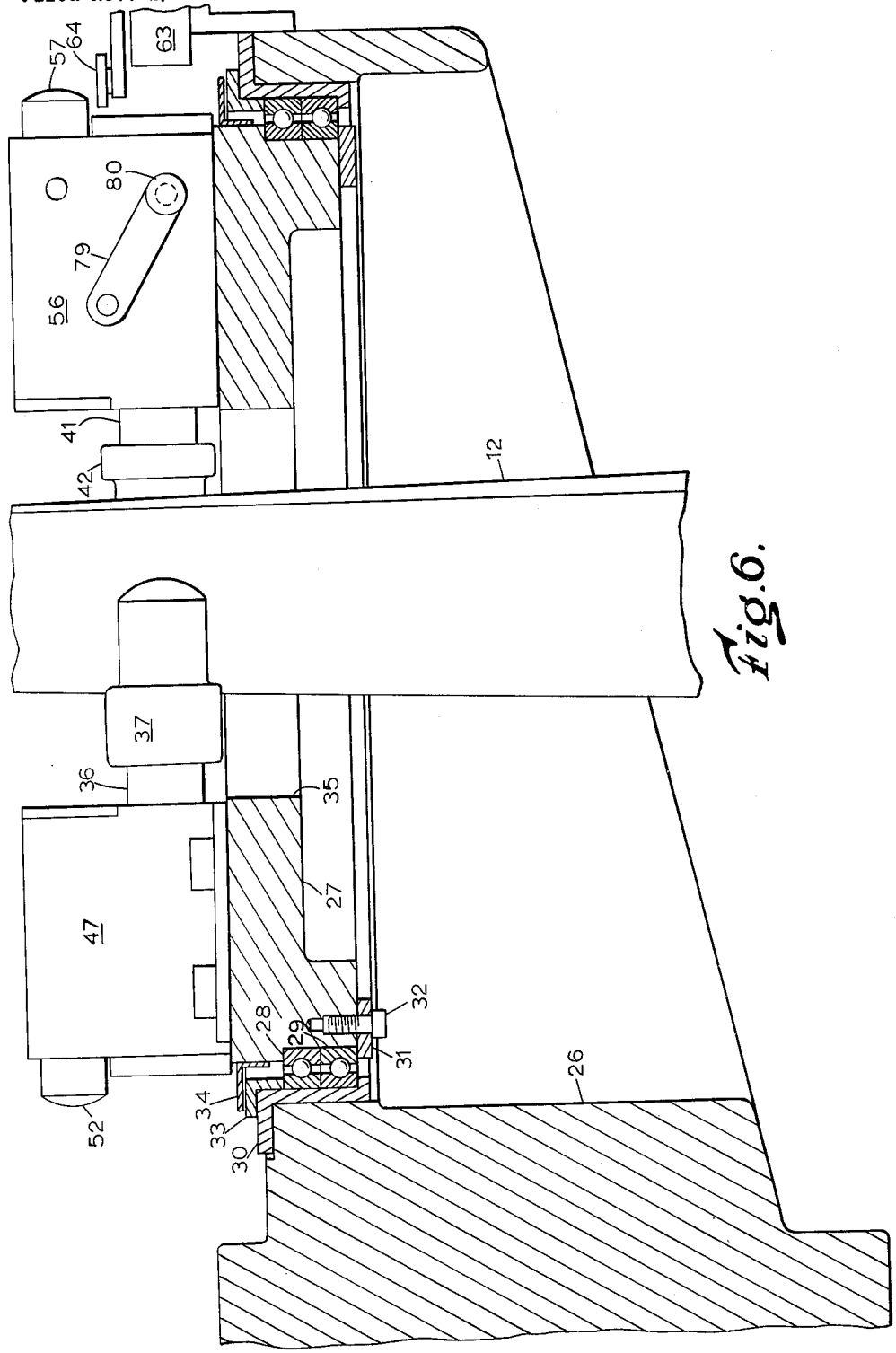
FIG. 6 is a full sectional view of the mechanism of FIG. 2 along line 6—6 thereof.

The mechanism of this invention is carried in a support member 26 that is attached to the front of the saddle 17 and which extends outward therefrom in a cantilever manner just below the cutting tools 20. As previously noted, the machine described includes a plurality of work stations in line and each of these is the same as the next. The mechanism of this invention is duplicated at each work station and therefore a description of one will serve for all. The mechanism is shown best with respect to FIGS. 2 and 6. As shown in FIG. 6, the support member 26 surrounds each area at which a blade blank 12 is rotated during machining and is at a position intermediate to the ends of the blade blank 12. An annular opening is formed through the support member 26 at each work station in the machine and each opening is adapted to receive a turn table or platform member 27 for free rotation therein. To this end, a set of antifriction bearings 28, 29 are received between the platform 27 and a liner member 30 received in the support member 26. The bearings 28 and 29 are retained in position at their inner race by an annular member 31 that is secured to the lower or under side of the platform 27 by machine screws 32 and at their outer race by a flanged member 33 fixed to the liner 30. The upper side of the bearings is protected against the entry of chips and dirt by an annular member 34 that is secured to the platform 27 and which extends over the flanged member 33 in close proximity thereto. Since the platform 27 is held in the support member 26 by the bearings 28 and 29, the platform 27 is freely rotatable in the support member 26 but is restrained, at the same time, against lateral or sideways movement. The axis on which the blade blank 12 is rotated is fixed and the axis on which the platform 27 is free to rotate corresponds to that axis. As shown, the platform 27 has an opening 35 centrally therethrough and the blade blank 12 is loosely received through this opening. The blade blank 12 and opening 35 are so related that the blade blank 12 can pass freely into and through the opening 35 without contacting the sides thereof.

The platform 27 carries a mechanism which operates to grip the blade blank 12 from opposite sides to secure it against the lateral deflection during a machining operation. The mechanism is comprised of two similar although not identical units each located on one side and the other of the blade blank 12 and the opening 35. One of the two units includes a plunger 36 to which a fork member 37 is attached for limited pivotal movement by a pin 38 and this fork 37 carries hardened members 39 and 40 which are adapted to engage against the back or convex side of the blade blank 12. The fork 37 is received for limited pivotal movement on the plunger 36 to allow it to adjust to blade contour changes as it is moved end to end since it is common to have blades of very complex shape including a twist from end to end. The other one of the gripping mechanisms includes a plunger member 41 to which a fork member 42 is solidly attached by a pin 43 to prevent any limited pivotal movement with respect to the plunger 41. The fork 42 also carries a pair of hardened members 44 and 45 which are adapted to engage against the concave or bucket side of the blade blank 12. It can be seen that the hardened members 39 and 40 of the fork member 37, as well as the hardened members 44 and 45 of the fork member 42, engage against the blade blank at spaced locations which have small areas of contact. The spacing of the points of contact of the hardened members 39, 40, 44 and 45 permits the gripping mechanism to be moved downward along the blade blank 12 without interfering with projections that occur on the blade blank 12 such as the wire lashing studs 46 that project outward from the blade blank 12 and represent deviations from a normal aerodynamic shape of the blade. The fork members 37 and 42 and the hardened engaging members 39, 40, 44 and 45 are designed for the general blade contour to be machined. In this respect the forks 37 and 42 represent unique tooling members that may be changed for blade contours which are substantially different.

Figure 5:
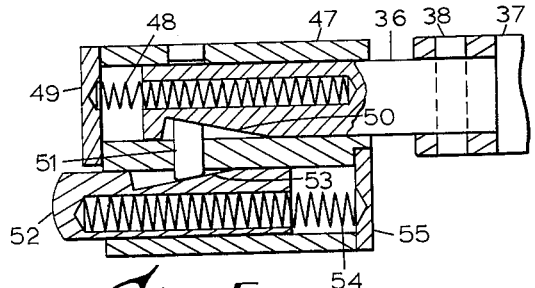
FIG. 5 is a partial section view of the mechanism of FIG. 2 along the line 5—5 thereof.
Figures 3, 4:
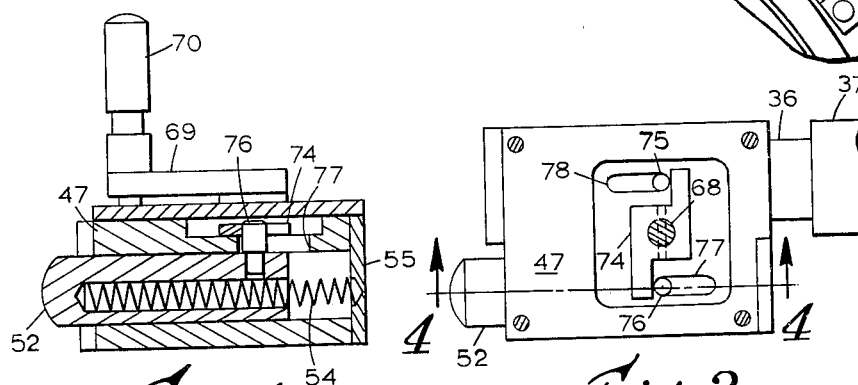
FIG. 3 is a section view of the mechanism of FIG. 2 along line 3—3 thereof.
FIG. 4 is a section view of the apparatus of FIG. 3 taken along line 4—4 thereof.

Each of the plungers 36 and 41 is supported and actuated by identical mechanisms. Therefore only one of these will be described in detail and it is shown in FIGS. 3, 4, and 5. The plunger 36 is slidably received in a housing 47 and is constantly urged outward therefrom by a spring 48 that is compressed between the plunger 36 and rear cover plate 49. Therefore a force is produced causing the plunger 36 to be urged outward until the fork 37 and its engaging members 39 and 40 are received against the back of the blade 12. Movement of the plunger 36 outward from the housing 47 is permitted at all times although movement of the plunger 36 back into the housing is prevented by a locking mechanism included in the gripping unit. The plunger 36 has a beveled notch 50 along one side thereof and this notch is engaged by a pin 51 that is received in the housing 47 for sliding movement in a direction transverse to the direction of movement of the plunger 36. The end of the pin 51 opposite the plunger 36 is engaged against a plunger 52 in a notch 53 having a sloped surface like that of the notch 50. A spring 54 is compressed between the plunger 52 and a cover plate 55 that is secured to the housing 47. Therefore the plunger 52 is urged outward from the housing 47 in a direction opposite to that of the plunger 36. This results in a firm engagement of the pin 51 at each end of the notches 50 and 53. Movement of plunger 36 into the housing 47 is therefore prevented from occurring unless the plunger 52 is shifted against its spring bias to provide clearance for movement of the pin 51. The plunger 41 is held in a housing 56 in the same manner as the plunger 36 is supported in the housing 47. Similarly a locking plunger 57 is provided in the housing 56 and operates in association with the plunger 41 to permit the plunger 41 to move outward from the housing 56 but at the same time prevents retraction of the plunger 41 unless the locking plunger 57 is shifted into the housing 56. Therefore both of the gripping forks 37 and 42 will be extended out against the blade blank 12 and will be held at a fixed position with respect to the housings 47 and 56 until the locking plungers 52 and 57 are pushed into the housing 47 and 56 respectively to permit the plungers 36 and 41 to be pushed back into the same housing.

Figure 2:
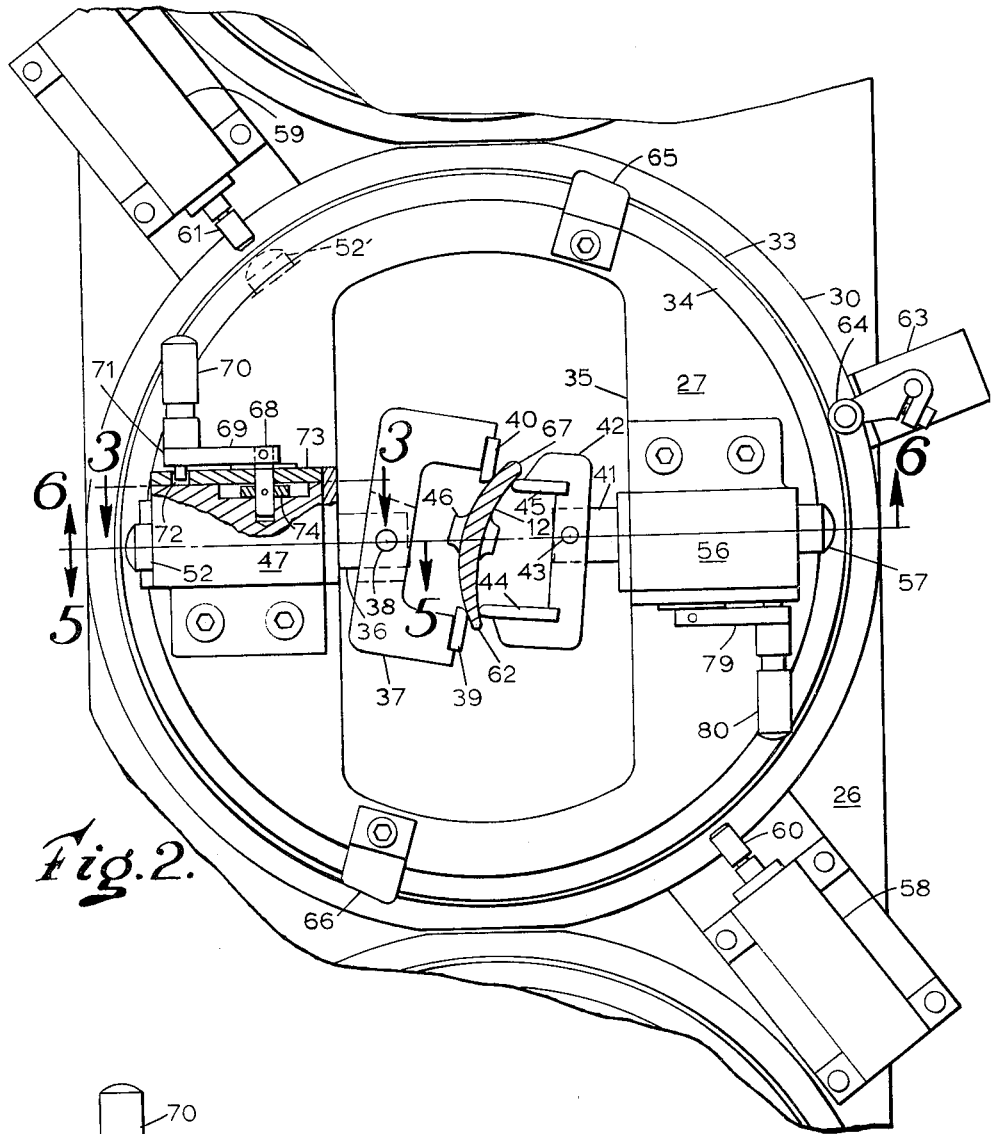
FIG. 2 is a partial plan view of the unit which includes the mechanism of this invention, the view having a portion shown in section.

Since the cutting operation begins at the tip end of the blade blank 12 which is the smallest in cross section and proceeds progressively along the blade blank toward the fixture 11, the pressure on the plungers 36 and 41 increases due to the increase in size of cross section of the blade blank 12. This pressure would soon become excessive and therefore would increase the resistance to downward feed of the saddle 17 until eventually the feed mechanism might stall. Control means are therefore provided by which the locking plungers 52 and 57 are moved into the housings 47 and 56 to release the plungers 36 and 41 for movement into these housings. The release mechanism is supported on the support member 26 and is comprised of a pair of hydraulic piston and cylinder motors 58 and 59 that are positioned in diametrically opposed locations across the opening in which the platform 27 is received. A piston 60 and 61 extends outward from each of the motors 58 and 59, respectively, and toward the platform 27 at an elevation thereabove such that it corresponds to the elevation of the plungers 52 and 57 above the platform 27. As shown in FIG. 2 the plungers 52 and 57 are also diametrically opposite to one another on the platform 27. When the platform 27, which rotates with the blade blank 12 during the cutting operation, is turned clockwise so that the plunger 52 is opposite the piston 61 and in the position indicated 52', the motors 58 and 59 can be energized and the plungers 52 and 57 will both be moved into the housings 47 and 56 simultaneously. At the time that the plunger 52 is in the position 52', the blade 12 will have been rotated so that its trailing edge portion 62 is against the cutter 20. The cutting forces are at a low or minimum magnitude condition at this time and the tendency for the blade to be deflected is reduced. Also the long cross sectional dimension of the blade 12 extends away from the edge 62 and the blade blank 12 will appear stiffest at this time to provide the most rigid condition of the blade in its unsupported condition. The motors 58 and 59 can then be briefly operated to extend the pistons 60 and 61 to unlock the plungers 36 and 41 momentarily so that any excess pressure resulting from an increase in size of cross section can be relieved and the plungers 36 and 41 reset in a new position in the housing 47 and 56.

The operation of the motors 58 and 59 is controlled automatically as the platform 27 and blade 12 rotate. A limit switch 63 is mounted on the support member 26 and has a trip arm 64 that extends toward the platform 27 at an elevation that does not interfere with any other mechanism or member thereon except for a pair of dogs 65 and 66. The dogs 65, 66 are secured to the platform 27 and extend upward and outward to engage the trip arm 64 as the platform 27 is rotated. It can be seen that the dog 65 will be rotated to a position at the trip arm 64 at the same time that the plunger 52 is rotated from the position shown to the position indicated as 52'. This condition corresponds to the rotation of the trailing edge to a position at the cutter 20. The engagement of the dog 65 with the trip arm 64 results in a signal being produced which, through ordinary control circuitry not shown, energizes the motors 58 and 59 by the connection of the fluid under pressure thereto to momentarily depress the plungers 52 and 57. In a similar manner, the dog 66 is rotated around clockwise to a position which finally brings it into contact with the trip arm 64 and this also will produce a signal which will energize the motors 58 and 59 momentarily. At that time the plunger 52 will have been moved opposite to the piston 60 and the plunger 57 will have been moved opposite to the piston 61. At the same time, the blade 12 will have been rotated clockwise to a position to bring an area near to its leading edge 67 into contact with the cutting tool 20. Cutting conditions are similar at this time as when the cutting tool is in engagemen with the area near to the trailing edge 62 and the cutting forces and deflection of the blade 12 and the lateral direction will be minimized. The plungers 52 and 57 are again moved into the housing 47 and 56 to release the plungers 36 and 41 for movement of each into its respective housing and again the excess pressure on the plungers 36 and 41 will be permitted to relax. It can be seen that the pistons 60 and 61 and the plungers 52 and 57 bear a relationship diametrically opposite to one another. The signals from the limit switch 63 then occur each 180 degrees of rotation of the platform 27 and blade 12. It can be seen from the shape of the blade that the angular spacing of the leading and trailing edges 67 and 62, respectively, is not 180 degrees. However, the range of rotation through which the blade 12 must be carried in order for the cutter to negotiate the entire leading and trailing edge portions 67 and 62 is a considerable amount and provides a rather wide range in which the limit switch can be operated and in which the cutting forces and deflection of the blade 12 will be a minimum or relatively small magnitude. Therefore the 180 degree spacing of the actuating plungers 52 and 57 and the pistons 60 and 61 will be adequate for most cases. It should be pointed out that additional pistons 60 and 61 and limit switches 63 can be provided and the dogs 65 and 66 can be positioned at some relationship other than 180 degrees so that the plungers 52 and 57 will be moved into the housing 47 and 56 at the times that the center of the edges 62 and 67 are exactly opposite to the cutting tool 20.

For purposes of initial set-up, the machine is also equipped with means for manually releasing the plungers 36 and 41 and for moving them back into the housings 47 and 56 so that a new blade blank 12 can be inserted easily into the anti-deflection mechanism described. For this purpose each of the units of the gripping mechanism is provided with a manual actuating lever. They both operate in an identical manner so that a description of one will serve as a description of both. As shown in FIG. 2, a pin 68 is rotatably received in the housing 47. A crank 69 is fixed to the pin 68 and a handle 70 is secured to the crank 69. The handle 70 may be pulled outward from the crank 69 to move a pin 71 out of a socket 72 that is formed in a cover plate attached to the side of the housing 47. When the handle 70 is pulled outward to move the pin 71 out of the socket 72 the crank 69 can be rotated. This also rotates the pin 68 to which a member 74 is attached in a fixed angular position. The member 74 is adapted to engage against pins 75 and 76 on opposite sides of the pivotal pin 68. As shown in FIG. 4, the pin 76 is fixed in the plunger 52 and extends outward therefrom through a slot 77 in the housing 47 to the position where it is contacted by the member 74. The pin 75 similarly extends through a slot 78 in the housing 47 and is fixed in the plunger 36. As viewed in FIG. 3, when the pin 68 is rotated in the counter-clockwise direction the member 74 will engage against the pins 75 and 76 and move the pins 75 and 76 in the slots 78 and 77, respectively. This results in a simultaneous movement of the plunger 52 and the plunger 36 into the housing 47 to provide the appropriate clearance for insertion of a blade blank 12 into the mechanism. The gripping mechanism in the housing 56 is provided with a crank 79 and a handle 80 for manual retraction of the plunger 41 which occurs, as previously stated, in a manner exactly like that described for the retraction of the plunger 36.

While the invention has been described in connection with one possible form or embodiment thereof it is to be understood that the present disclosure is illustrative rather than restrictive and that changes and modifications may be made without departing from the spirit of the invention or the scope of the claims which follow.

What is claimed is:

1. In a machine tool having a fixture for supporting a work blank by an end thereof and for rotating the work blank on a fixed axis and a cutting tool relatively movable along the work blank and simultaneously movable toward and away from the work blank, an intermediate support mechanism adapted to reduce lateral deflection of the work blank comprising:
    (a) a platform having an opening centrally therethrough for loose receipt of the work blank,
    (b) means for supporting said platform for free rotation on the fixed axis and for moving said platform toward the fixture in advance of the cutting tool,
    (c) gripping means on said platform for forcibly engaging the work blank therebetween, and
    (d) release means for momentarily relaxing the engagement of said gripping means in timed relation with rotation of the work blank and platform.

2. The machine tool mechanism of claim 1 wherein:
    (a) said gripping means includes a pair of plungers supported on said platform on opposite sides of said opening therethrough and biased for advancement against the work blank extending therethrough,
    (b) said gripping means further includes means for locking said plungers in position against the work blank, and
    (c) said release means is an actuator mechanism supported by said means for supporting the platform and is operable in timed relation with rotation of said platform to unlock said locking means.

3. In a milling machine for producing aerodynamic turbine blades having leading and trailing edges, the machine having a fixture for supporting a blade blank by an end thereof and for rotating the blade blank on a fixed axis and a cutting tool relatively movable along the blade blank and simultaneously movable toward and away from the blade blank, an intermediate support mechanism adapted to reduce lateral deflection of the blade blank comprising:
    (a) a platform having an opening centrally therethrough for loose receipt of the blade blank,
    (b) means for supporting said platform for free rotation on the fixed axis and for moving said platform toward the fixture in advance of the cutting tool,
    (c) gripping means on said platform for forcibly engaging the blade blank therebetween, and
    (d) release means for momentarily relaxing the engagement of said gripping means, in timed relation with the passage of the cutter by each of the leading and trailing edge portions.

4. A turbine blade milling machine having a fixture for supporting and rotating a blade blank, a rotatable spindle mechanism adapted for securing a cutting tool thereto, and a compound slide mechanism for relatively moving the spindle mechanism along the length of the blade blank while simultaneously moving the spindle mechanism toward and away therefrom and in coordination with rotation thereof, an intermediate support mechanism adapted to reduce lateral deflection of the blade blank comprising:
    (a) a support member secured to the slide mechanism at a location between the spindle mechanism and the fixture and relatively movable along the blade blank with the spindle mechanism,
    (b) a rotatable platform carried by said support member and having an opening centrally therethrough for loose receipt of the blade blank,
    (c) stabilizing means on said platform for forcibly engaging opposite sides of the blade blank,
    (d) locking means for holding said stabilizing means in a fixed condition with respect to the blade blank, and
    (e) means for releasing said locking means to permit readjustment of said stabilizing means in timed relation with the rotation of said fixture.

5. In a milling machine for producing turbine blades having aerodynamic shapes including leading and trailing edge portions, the machine having a fixture for supporting and rotating a blade blank, a rotatable spindle mechanism adapted for securing a cutting tool thereto, and a compound slide mechanism for relatively moving the spindle mechanism along the length of the blade blank while simultaneously moving the spindle mechanism toward and away therefrom and in coordination with rotation thereof, an intermediate support mechanism adapted to reduce lateral deflection of the blade blank comprising:
    (a) a support member secured to the slide mechanism at a location between the spindle mechanism and the fixture and relatively movable along the blade blank with the spindle mechanism,
    (b) a rotatable platform carried by said support member and having an opening centrally therethrough for loose receipt of the blade blank,
    (c) stabilizing means on said platform for forcibly engaging opposite sides of the blade blank, (d) locking means for holding said stabilizing means in a fixed condition with respect to the blade blank, and (e) means for momentarily releasing said locking means to permit readjustment of said stabilizing means when one of the edge portions is turned toward the spindle mechanism.

6. The milling machine mechanism of claim 5 wherein:

(a) said last recited means momentarily releases said locking means when each of the leading and trailing edge portions is turned toward the spindle mechanism.

7. In a milling machine for producing turbine blades having aerodynamic shapes including leading and trailing edge portions, the machine having a fixture for supporting and rotating a blade blank on a fixed axis, a rotatable spindle mechanism adapted for securing a cutting tool thereto, and a compound slide mechanism for relatively moving the spindle mechanism along the length of the blade blank while simultaneously moving the spindle mechanism toward and away therefrom and in coordination with rotation thereof, an intermediate support mechanism adapted to reduce lateral deflection of the blade blank comprising:

(a) a support member secured to the slide mechanism at a location between the spindle mechanism and the fixture and relatively movable along the blade blank with the spindle mechanism, (b) a platform carried by said support member having an opening centrally therethrough for loose receipt of the blade blank and freely rotatable on the fixed axis of rotation of the work blank, (c) stabilizing means on said platform for forcibly engaging opposite sides of the blade blank, (d) locking means for maintaining said stabilizing means in a constant condition, (e) release means carried on said support member for unlocking said locking means momentarily to permit said stabilizing means to readjust against the blade blank, (f) signal means carried on said support member for actuating said release means when tripped, and (g) trip means carried on said platform for tripping said signal means when one of the blade edge portions is turned toward the spindle mechanism.

8. The milling machine mechanism of claim 7 wherein:

(a) said stabilizing means is a pair of plungers carried on said platform and includes a spring biasing mechanism urging said plungers toward the blade blank, and (b) said locking means operates to prevent movement of said plungers away from the blade blank when not unlocked.

9. The milling machine mechanism of claim 8 wherein:

(a) each of said plungers has a plurality of finger portions engaging the blade blank at spaced small areas of contact.

10. The milling machine mechanism of claim 7 wherein:

(a) said trip means is a pair of dogs positioned on said platform to engage said signal means when each of the leading and trailing edges is turned toward the spindle mechanism.

11. In a milling machine for producing turbine blades having aerodynamic shapes including leading and trailing edge portions, the machine having a fixture for supporting and rotating a blade blank on a fixed axis, a saddle movable along the blade blank parallel to the fixed axis and toward the fixture, a spindle carrier supported on the saddle for movement toward and away from the fixed axis in coordination with rotation of the work blank, and a spindle, including a cutting tool, rotatably received in the spindle carrier for machining the blade blank, an intermediate support mechanism adapted to reduce lateral deflection of the blade blank during machining comprising:

(a) a support member fixed to the saddle between the cutting tool and fixture, (b) a platform received in anti-friction bearings in said support member for free rotation therein on the fixed axis and having an opening centrally therethrough for loose receipt of the blade blank, (c) gripping means on said platform for forcibly engaging the blade blank therebetween, and (d) release means for momentarily relaxing the engagement of said gripping means when one of the blade edge portions is against the cutting tool.

12. The milling machine mechanism of claim 11 wherein said gripping means includes:

(a) a pair of plungers on opposite sides of said platform adapted to engage against the blade blank and (b) means for locking said plungers in position against the blade blank.

13. The milling machine mechanism of claim 12 wherein said releasing means includes:

(a) a signal device on said support member, (b) trip members on said platform in predetermined positions relative to the edge portions and operable to actuate said signal device as said platform is rotated, and (c) means responsive to actuation of said signal device for unlocking said means for locking.

No references cited.

WILLIAM W. DYER, Jr., *Primary Examiner.*

G. A. DOST, *Assistant Examiner.*